United States Patent

[11] 3,619,403

[72] Inventor Georges J. Gorin
     Waltham, Mass.
[21] Appl. No. 51,275
[22] Filed June 30, 1970
[45] Patented Nov. 9, 1971
[73] Assignee LFE Corporation
     Waltham, Mass.

[54] GAS REACTION APPARATUS
     6 Claims, 1 Drawing Fig.
[52] U.S. Cl. .................................... 204/312,
     204/164, 204/193
[51] Int. Cl. ..................................... B01k 1/00
[50] Field of Search .......................... 204/312,
     164, 176

[56]         References Cited
         UNITED STATES PATENTS
3,547,802  12/1970  Gleit et al. .................. 204/312
3,428,548   2/1969  Hollahan ..................... 204/312

Primary Examiner—John H. Mack
Assistant Examiner—Neil A. Kaplan
Attorney—Richard J. Donahue ABSTRACT: A gas, such as oxygen, is fed to a cylindrical reaction chamber to which an intense high-frequency electromagnetic radiation field is applied. As the gas enters the reaction chamber it is ionized by the high-frequency electromagnetic field. The ionized gas reacts with a nongaseous material inserted within the chamber to decompose the material. The resultant products, together with any unreacted species of the gas, are withdrawn from the chamber by a vacuum pump. The reaction chamber is constructed so as to provide a uniform distribution of the gas throughout the reaction zone of the chamber.

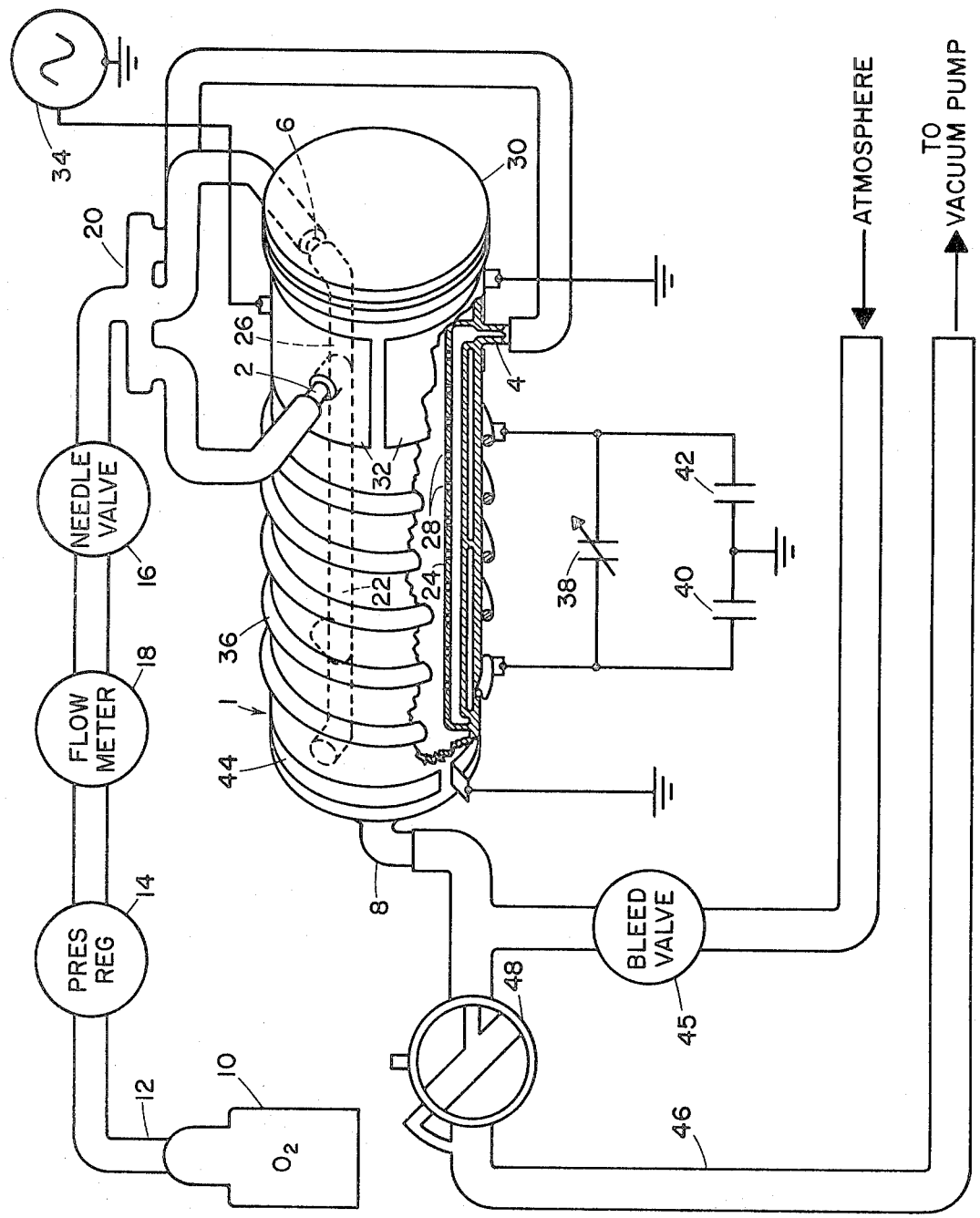

GAS REACTION APPARATUS

FIELD OF INVENTION

This invention relates to gas reaction apparatus and, more particularly, it is concerned with an improved reaction chamber for such apparatus.

BACKGROUND OF INVENTION

In U.S. Pat. No. 3,410,776, issued to Richard Bersin and assigned to the same assignee as the present invention, apparatus is described for providing a reaction between a gas and a nongaseous substance. The apparatus disclosed in this patent includes a reaction chamber having a single port for introducing an activated gas within the material-handling portion of the chamber. It has been found that, in reaction chambers of this type, the gas is unevenly distributed throughout the reaction zone of the chamber. Consequently, the decomposition of the material within the reaction zone of the chamber occurs at different rates, an undesirable condition. In U.S. Pat. No. 3,428,548, issued to John R. Hollahan, and assigned to the same assignee as the present invention, there is disclosed a reaction chamber having several gas input ports, within which the gas is ionized and subsequently fed to the reaction zone of the chamber. The provision of multiple input ports, as taught in the latter patent, improves somewhat the distribution of the gas within the chamber. However, it has been found that the concentration of the gas is not sufficiently uniform throughout the material-handling zone of the chamber. Moreover, it is not uniform about the circumference of the chamber.

SUMMARY OF INVENTION

It is an object of the present invention to provide gas reaction apparatus which provides a uniform distribution of the gas throughout its material-handling chamber.

The foregoing and other objects are accomplished by providing a chamber having a plurality of tubes disposed along the interior wall thereof. Each of the tubes has a plurality of holes along its length and has one end thereof coupled to a gas inlet port disposed on the outer wall of said chamber. The gas inlet ports are in turn connected to a common gas input source.

DISCLOSURE OF PREFERRED EMBODIMENTS

Other objects, features, and advantages will occur from the following description of a preferred embodiment when taken in conjunction with the accompanying drawing in which:

The FIGURE is an illustration in diagrammatic form of a gas reaction system constructed in accordance with the principles of the present invention.

With reference now to the drawing, it will be observed that reference numeral 1 designates, generally, a reaction chamber having three inlet ports, 2, 4, and 6, and an outlet port 8. A container 10 of molecular gas, such as oxygen, is coupled to the reaction chamber 1 by way of a feed line 12. In the feed line 12 downstream from the oxygen container 10 there is provided a pressure regulator valve 14. The pressure regulator valve 14 may be provided as an integral part of the oxygen container 10 as is usual in commercial containers of molecular gases. Also inserted into feed line 12 between oxygen container 10 and reaction vessel 1 are a needle valve 16 and a flow meter 18 to adjust the flow rate of gas through the system and to continually monitor the resultant flow rate, respectively. Feed line 12 branches out into three channels at a gas coupler 20 to join reaction vessel 1 at inlet ports 2, 4, and 6.

A portion of the reaction chamber 1 has been broken away on the drawing in order to better illustrate one of the tubes, 22, 24, and 26, which are disposed along the inner walls of the chamber and have one end thereof fused to the gas inlet ports 2, 4, and 6, respectively. Each of the tubes has a plurality of holes 28 along the length thereof and has its other end closed and fused to the interior wall of the chamber. The portion of the chamber spanned by the tubes 2, 4, and 6 constitutes the reaction zone of the chamber.

The chamber is provided with an opening at one end thereof for inserting and removing the nongaseous material to be reacted. The material may, for example, consist of a tray of semiconductor wafers having a photoresist coating thereon which is to be decomposed. The opening is provided with a closure in the form of a caplike cover 30 which is fitted tightly over the opening after the material is inserted.

Surrounding the chamber is a resonant circuit adapted to couple an electromagnetic field to the gas within the chamber. The resonant circuit shown here is the same as that described and claimed in a copending application of Georges J. Gorin, Ser. No. 882,522, filed Dec. 5, 1969 and assigned to the assignee of the present invention. It will be recognized, however, that other forms of such resonant circuits may be used to couple energy to the reaction chamber.

The resonant circuit includes a capacitor 32 consisting of a pair of semicircular plates around a portion of the chamber in the vicinity of the inlet ports 2, 4, and 6. One of the plates is connected to an RF generator 34 while the other plate is grounded. Surrounding the central portion of the chamber is a coil 36. Coil 36 is connected across a variable capacitor 38 and also across the series combination of a pair of capacitors 40 and 42 of equal value. The common junction between capacitors 40 and 42 is connected to ground. Adjacent the coil 36, there is an electrode 44 at ground potential which is shaped like a band around the chamber. It acts as an open loop that partially deactivates the excited gas downstream from the reaction zone, and enhances the electrical symmetry between coil 36 and ground.

The outlet port 8 of the chamber is connected to a vacuum gauge (not shown) to continually measure the pressure within the chamber. Outlet port 8 is also connected to the atmosphere through a bleed valve 45 and to a vacuum pump by way of an outlet line 46. A control valve 48, which is shown diagrammatically, having three positions (fully open, partially open, and fully closed), is inserted into outlet line 46.

In operation the nongaseous material to be reacted is placed within the chamber and the system is initially pumped down to withdraw air and residual gas from the chamber by way of the outlet port 8. The rate of pumpdown may be controlled by adjusting valve 48. For instance, if a fast pumpdown is desired, the valve is set to a full open position. If not, the position shown in the drawing is adequate. Bleed valve 45 is normally closed at this time and is opened to slowly return the chamber to atmospheric pressure.

After a desired pumpdown has been obtained, the pressure regulator valve 14 is adjusted to initiate a flow of oxygen through the flow meter 18, the needle valve 16, and the gas inlet coupler 20, thence to the input ports 2, 4, and 6 of the reaction chamber 1. The oxygen flow simultaneously enters the chamber by way of inlet ports 2, 4, and 6, and flows through the tubes 22, 24, and 26 and thence through the holes 28 in each of the tubes to provide an even distribution of the gas within the chamber.

Generator 34 is then enabled to deliver power to the gas via a matching network (not shown) to the capacitor 32. The amount of power supplied by the generator may be in the vicinity of a few hundred watts at a frequency approximating 13 megahertz. This produces highly excited species of the gas, such as atomic oxygen capable of entering into reactions that would otherwise be energetically unfavorable. The volatile components produced by the reaction, as well as the unreacted oxygen, are continually removed from the chamber through the action of the exhaust pump.

Although the invention has been described with reference to a preferred embodiment, it will be apparent, of course, that other modifications may be made within the scope contemplated by the invention. For instance, the number of tubes is optional and depends somewhat on the size of the chamber. Consequently, the invention herein described is to be construed to be limited only by the spirit and scope of the appended claims.

What is claimed is:

1. Apparatus for reacting a gas with a nongaseous material comprising:
   a reaction chamber of a generally cylindrical shape having a removable closure means at one end thereof for inserting and removing the nongaseous material,
   means for introducing and distributing a gas within said chamber,
   means for ionizing the gas within said chamber,
   and means for withdrawing the gas from said chamber,
   said means for introducing and distributing the gas within said chamber comprising
   a plurality of tubes disposed along the interior wall of said chamber,
   each of said tubes having a plurality of holes along its length and having one end thereof coupled to a gas inlet port disposed on the outer wall of said chamber.

2. Apparatus as defined in claim 1 wherein said tubes are symmetrically disposed about the interior wall of said chamber and have an outer diameter which is small with respect to the inner diameter of said chamber.

3. Apparatus as defined in claim 1 wherein said means for ionizing the gas within said chamber includes a RF generator having its output coupled to a resonant circuit surrounding said chamber.

4. Apparatus as defined in claim 1 wherein said means for withdrawing the gas from said chamber includes a gas outlet port located at the other end of said chamber.

5. Apparatus as defined in claim 1 wherein said chamber includes three of said tubes symmetrically disposed about the interior wall of said chamber, each of said tubes having its axis aligned parallel with the axis of said chamber and having the holes therein directed towards the axis of said chamber.

6. Apparatus as defined in claim 5 wherein the holes are equally spaced along the length of said tubes.

* * * * *